(12) United States Patent
Venkiteswaran et al.

(10) Patent No.: US 10,755,494 B2
(45) Date of Patent: Aug. 25, 2020

(54) VEHICLE COMPONENT DIAGNOSTIC

(71) Applicant: Ford Global Technologies, LLC, Dearborn, MI (US)

(72) Inventors: Prasad Venkiteswaran, Canton, MI (US); Shehan Haputhanthri, Canton, MI (US); Matthew Joseph, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 16/054,570

(22) Filed: Aug. 3, 2018

(65) Prior Publication Data
US 2020/0043257 A1 Feb. 6, 2020

(51) Int. Cl.
| G07C 5/08 | (2006.01) |
| G07C 5/00 | (2006.01) |
| B60C 23/04 | (2006.01) |
| B60C 11/24 | (2006.01) |
| H04L 12/26 | (2006.01) |

(52) U.S. Cl.
CPC .......... *G07C 5/0808* (2013.01); *B60C 11/243* (2013.01); *B60C 23/0481* (2013.01); *G07C 5/008* (2013.01); *H04L 43/045* (2013.01); *H04L 43/16* (2013.01)

(58) Field of Classification Search
None
See application file for complete search history.

(56) References Cited

U.S. PATENT DOCUMENTS

| 6,678,591 | B2 | 1/2004 | Ohmura et al. |
| 7,092,803 | B2 | 8/2006 | Kapolka et al. |
| 7,155,321 | B2 | 12/2006 | Bromley et al. |
| 7,729,823 | B2 | 6/2010 | Ruoppolo |
| 7,729,826 | B2 | 6/2010 | Zanardelli |
| 10,262,471 | B2* | 4/2019 | Kislovskiy ......... G08G 1/09623 |
| 2013/0193753 | A1* | 8/2013 | Brey .................... B60R 16/0231 307/10.7 |
| 2013/0246135 | A1 | 9/2013 | Wang |
| 2014/0357295 | A1* | 12/2014 | Skomra .............. G06Q 10/0833 455/456.1 |
| 2018/0050704 | A1* | 2/2018 | Tascione ............... B60W 10/04 |
| 2019/0009769 | A1* | 1/2019 | Antanaitis ............ G05D 1/0088 |
| 2019/0049954 | A1* | 2/2019 | Mitchell .............. G05D 1/0061 |
| 2019/0176639 | A1* | 6/2019 | Kumar ................... B60L 58/12 |
| 2019/0221058 | A1* | 7/2019 | Nix .......................... G07C 5/12 |

FOREIGN PATENT DOCUMENTS

CN 106781632 A 5/2017

* cited by examiner

*Primary Examiner* — Kaveh Abrishamkar
(74) *Attorney, Agent, or Firm* — Frank A. MacKenzie; Bejin Bieneman PLC

(57) ABSTRACT

A system includes a computer including a processor and a memory, the memory including instructions executable by the processor to identify a degraded state of a vehicle component when a component usage exceeds a first threshold and a weather datum exceeds a second threshold, and then actuate the vehicle component in response to the degraded state.

20 Claims, 6 Drawing Sheets

VEHICLE COMPONENT DIAGNOSTIC

BACKGROUND

Vehicles may be organized into fleets. The fleets may provide transit for, e.g., ride sharing, cargo moving, etc. The vehicles include components that require specific maintenance. To state just one example, a state of vehicle tires is important to safe and efficient vehicle operation. For example, the vehicles can include tires that wear down over time. It is a problem to collect data from the vehicles regarding their respective components and from external sources, e.g., it can be a problem that a state of vehicle tires cannot be efficiently and accurately determined.

DETAILED DESCRIPTION

Figure 1:
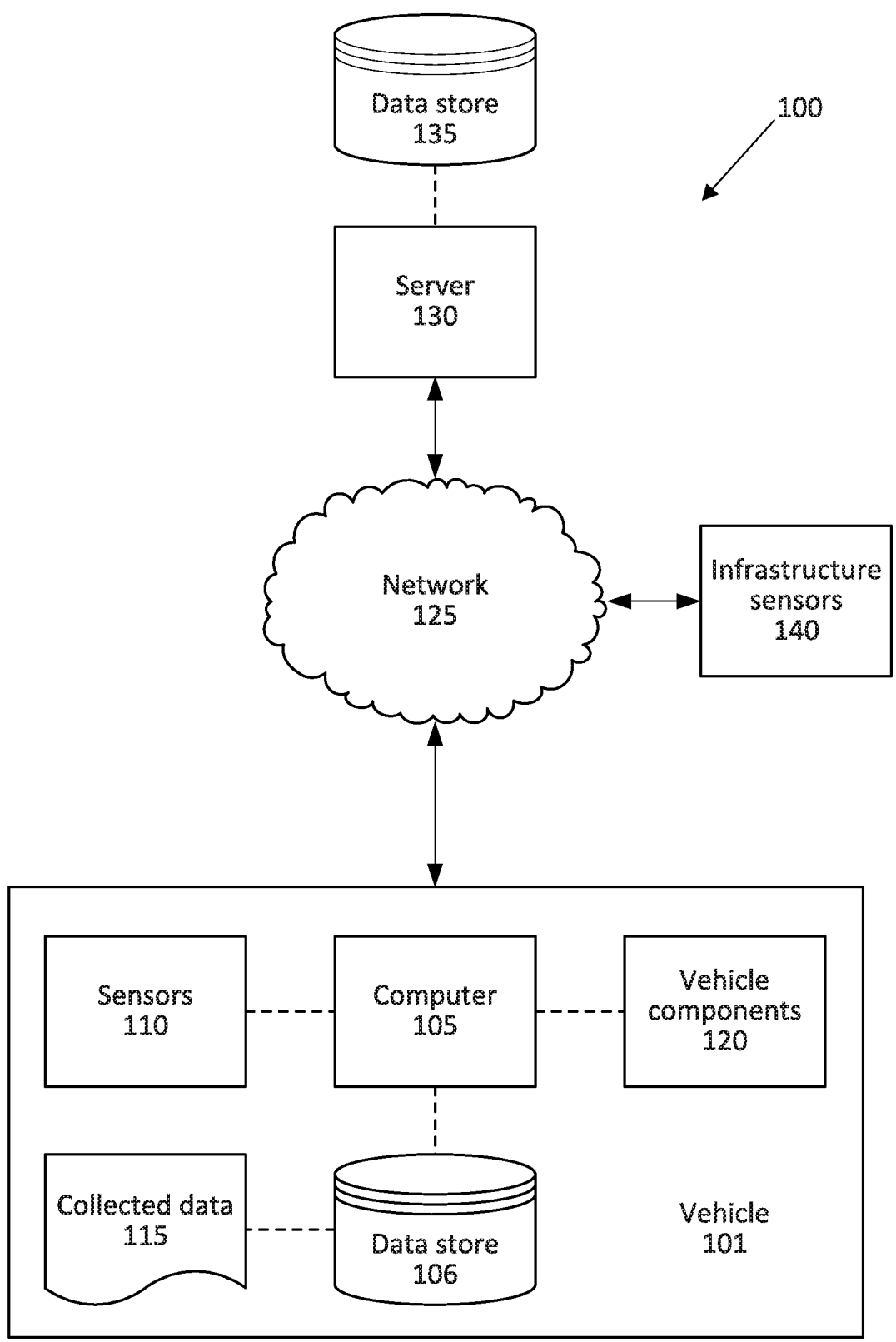
FIG. 1 is a block diagram of an example system for a vehicle component diagnostic.

A system includes a computer including a processor and a memory, the memory including instructions executable by the processor to identify a degraded state of a vehicle component when a component usage exceeds a first threshold and a weather datum exceeds a second threshold, and then actuate the vehicle component in response to the degraded state.

The instructions can further include instructions to identify a battery charge level of a battery and to actuate the battery to move a vehicle to a charging station in response to the degraded state when the battery charge level is below a battery charge threshold.

The instructions can further include instructions to identify a tire tread depth, to identify the degraded state based on the tire tread depth, and to actuate a propulsion in response to the degraded state when the tire tread depth is below a tread depth threshold.

The instructions can further include instructions to identify a fuel fill date, the fuel fill date indicating a most recent date that a fuel tank of a vehicle was filled, and to actuate a propulsion to consume fuel in response to the degraded state when the fuel fill date is older than a fill date threshold.

The instructions can further include instructions to identify a brake engagement date, the brake engagement date indicating a most recent date that a brake of a vehicle was actuated, to identify the degraded state when the brake engagement date is older than a brake engagement date threshold and to actuate the brake in response to the degraded state.

The instructions can further include instructions to determine a pavement temperature and to identify the degraded state for a tire when the pavement temperature is below a pavement temperature threshold and an elapsed parked time for a vehicle exceeds a parked time threshold.

The weather data can include data about an ambient temperature, the instructions can further include instructions to identify the degraded state based on the ambient temperature. The instructions can further include instructions to identify a battery charge level of a battery in a vehicle and to actuate the battery in response to the degraded state when the ambient temperature is below a first temperature threshold and above a second temperature threshold and when the battery charge level is below a battery charge threshold.

The instructions to actuate the vehicle component can further include instructions to actuate a propulsion to move a vehicle along a predetermined route for a predetermined period of time.

The component usage can include data about operation of a plurality of vehicle components from a most recent route performed by a vehicle, the route being a route followed by the vehicle from a start point to an end point. The instructions can further include instructions to assign a new route to the vehicle upon determining that the degraded state is resolved.

The instructions can further include instructions to collect component usage data from a plurality of vehicles, to identify one or more vehicles having a respective degraded state for at least one respective vehicle component, and to assign a route at least one of the vehicles lacking a degraded state.

A method includes identifying a degraded state of a vehicle component when a combination of component usage exceeds a first threshold and a weather datum exceeds a second threshold, and then actuating the vehicle component in response to the degraded state.

The method can further include actuating a propulsion to move a vehicle along a predetermined route for a predetermined period of time.

The component usage can include data about operation of a plurality of vehicle components from a most recent route performed by a vehicle, the route being a route followed by the vehicle from a start point to a destination.

The method can further include collecting component usage data from a plurality of vehicles, identifying one or more vehicles having a respective degraded state for at least one respective vehicle component, and assigning a route at least one of the vehicles lacking a degraded state.

A system includes means for identifying a degraded state of a vehicle component when a combination of component usage exceeds a first threshold and a weather datum exceeds a second threshold, and means for actuating the vehicle component in response to the degraded state.

The system can further include means for actuating a propulsion to move a vehicle along a predetermined route for a predetermined period of time.

The component usage can include data about operation of a plurality of vehicle components from a most recent route performed by a vehicle, the route being a route followed by the vehicle from a start point to a destination.

The system can further include means for collecting component usage data from a plurality of vehicles, means for identifying one or more vehicles having a respective degraded state for at least one respective vehicle component, and means for assigning a route at least one of the vehicles lacking a degraded state.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Collecting data from each vehicle of a plurality of vehicles in a fleet allows a server computer to perform vehicle component diagnostics, e.g., to identify degraded states for specific vehicles based on the collected data. Upon detecting a degraded state, the server can instruct vehicles with respective degraded states to resolve the degraded states and can assign routes to the remaining vehicles. The server can collect weather data as part of a component diagnostic, e.g., to identify the degraded states, including degraded states caused by extreme heat, extreme cold, and precipitation. Thus, operation of the vehicles in the fleet is improved, e.g., made more efficient by saving on fuel consumption, saving wear and tear of components, and safer, by identifying degraded states and resolving degraded states before the degraded states reduce performance and/or safety of the vehicles.

FIG. 1 illustrates an example system 100 for a vehicle 101 component 120 diagnostic whereby a degraded state can be detected. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 includes a plurality of infrastructure sensors 140. The infrastructure sensors 140 can include, e.g., cameras, air temperature sensors, pavement temperature sensors, etc., mounted to an infrastructure element such as a fence, a pole, a building, the ground, etc. As such, infrastructure sensors 140 are typically in a fixed, i.e., unchanging over time, location. The infrastructure sensors 140 can collect data 115 about vehicles 101 and other portions of an environment such as a storage area, e.g., a pavement, and send the data 115 over the network 125 to the server 130. storage area The server 130 can assign a route to a vehicle 101 including a start point to an end point of the route. The vehicle 101 can travel along the route from the start point to the end point. The route can be determined based on, e.g., a user request to move from a user location to a user destination. Thus, the route can have a start point at a storage area where the vehicle 101 is located, can include a user location as a waypoint, can move the user to the user destination, and can have an end point at the user destination, at a storage area where the vehicle 101 was originally located, etc. The server 130 can assign a plurality of routes to each of a plurality of vehicles 101.

The server 130 can collect component 120 usage data 115 about the components 120 actuated during the route. The data 115 can include data 115 about operation of a plurality of vehicle components from a most recent route performed by a vehicle 101. The server 130 can collect component usage data 115 from a plurality of vehicles 101, identify one or more vehicles 101 having a respective degraded state for at least one respective vehicle component 120, and assign a route at least one of the vehicles 101 lacking a degraded state. Assigning routes to vehicles 101 based on components lacking degraded states and identifying vehicles 101 having components with degraded states can improve operation of the fleet and availability of vehicles 101 assignable by the server 130.

The server 130 can identify a degraded state for a vehicle 101. As used herein, a "degraded state" is an identification of a vehicle component 120 that has a physical measurement (i.e., a measurement of some physical quantity) exceeding a predetermined limit of operation. The degraded state can lead to degradation or damage to the vehicle component 120, and upon identifying the degraded state, the server 130 can instruct the computer 105 of the vehicle 101 to obtain repair or maintenance to resolve the degraded states. Examples of degraded states include, e.g., fuel stored in a fuel tank for longer than a time threshold, battery charge level below a battery charge threshold, tire tread depth below a tread depth threshold, time and/or mileage elapsed since brake inspection exceeding a time and/or distance threshold, etc. Upon resolving the degraded state, the server 130 can assign a new route to the vehicle 101.

The server 130 can collect weather data 115. The server 130 can actuate one or more infrastructure sensors 140 to collect weather data 115, e.g., an ambient air temperature, an ambient humidity, etc. Alternatively or additionally, the server 130 can request weather data 115 from an external source, e.g., a weather station, that can include additional weather data 115, e.g., precipitation information, forecasts for temperature and precipitation, wind speed, etc. The server 130 can use the weather data 115 to identify a degraded state. The server 130 can identify a degraded state of a vehicle component 120 when component usage exceeds a first threshold and a weather datum from the weather data 115 exceeds a second threshold. For example, as described below, the server 130 can identify a degraded state for a battery when a battery charge level is below a battery charge threshold and an ambient air temperature is above a temperature threshold to prevent unnecessary degradation of a battery while charging at the ambient air temperature above the temperature threshold.

Figure 2:
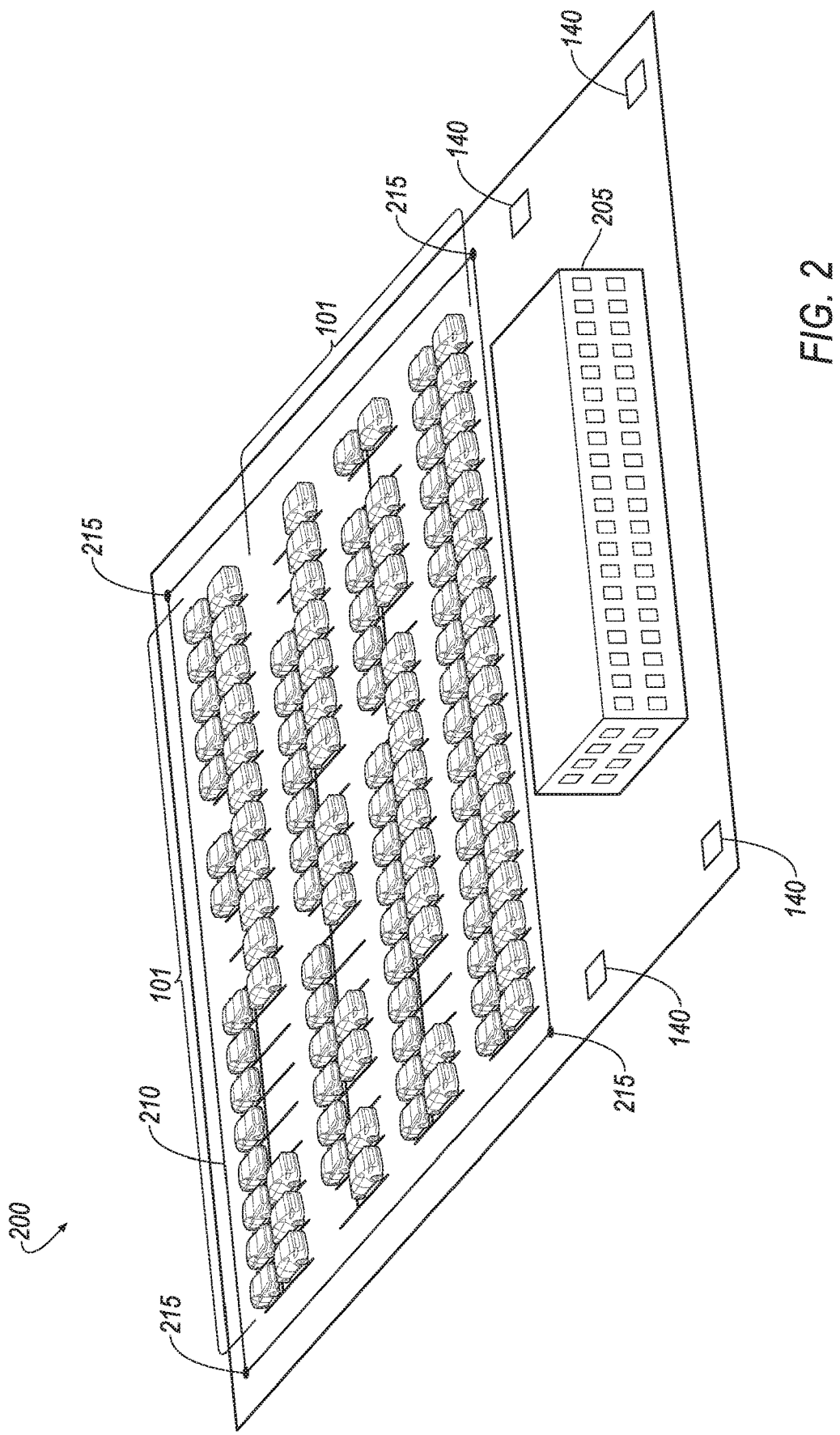
FIG. 2 is a view of an example storage area with a fleet of example vehicles.

FIG. 2 illustrates an example storage area 200 with a plurality of example vehicles 101. The storage area 200 includes a plurality of spaces in which the vehicles 101 can park, e.g., while awaiting assignment of a route by the server 130. The storage area 200 includes a plurality of infrastructure sensors 140, as described above. The infrastructure sensors 140 collect data 115 about the storage area 200, e.g., a pavement temperature, an ambient air temperature, visual data of the vehicles 101, etc. The infrastructure sensors 140 can send the collected data 115 to the server 130.

The storage area 200 can include a repair station 205. The repair station 205 can include one or more stations for repair of components 120 of the vehicles 101. The repair station 205 can include a fueling station to refuel the vehicles 101. The server 130 can instruct the computers 105 in the vehicles 101 to move the vehicles 101 to the repair station 205 to resolve degraded states. Alternatively, the repair station 205 can be located away from the storage area 200, i.e., the storage area 200 can lack a repair station 205.

The server 130 can assign a predetermined remediation route 210 to the vehicle 101. A "route" in this context is a path, having a start point and end point (i.e., origin and destination) that the vehicle 101 is to follow or follows, and can be determined by the server 130. A remediation route 210 is a route assigned by the server 210 to resolve one or more degraded states for a vehicle 101, e.g., a brake degraded state, the server 130 can instruct the computer 105 of the vehicle 101 to move the vehicle 101 along the remediation route 210. Some degraded states can be resolved by operating the vehicle 101 for a specified amount of time and/or according to certain parameters (e.g., speed, distance, braking duty cycle, etc.). The server 130 can accordingly determine a distance of a remediation route 210 and/or a specified period (i.e., amount) of time to move the vehicle 101 along the remediation route 210. The specified period of time can be based on, e.g., a time specified by a maintenance rule to operate the component 120 of the vehicle 101 to resolve the degraded state.

The storage area 200 can include checkpoints 215. The checkpoints 215 are predetermined locations in the storage area 200. The server 130 can determine the remediation route 210 by assigning the vehicle 101 to start at one of the checkpoints 215 and to travel to one or more of the other checkpoints 215. For example, the storage area 200 has four checkpoints 215, and the remediation route 210 can start at one of the checkpoints 215, move through the other three checkpoints 215, and back to the starting checkpoint 215. Certain degraded states can be resolved by moving the vehicle 101 along the remediation route 210 between the checkpoints 215, e.g., reducing a battery charge level below a charge maximum, reducing a fuel in a fuel tank that exceeded a fill date threshold, etc.

The vehicles 101 can be organized in a fleet. As used here, a "fleet" is a plurality of vehicles 101, where each can communicate with at least one server 130. The server 130 can assign routes to vehicles 101 in the fleet and can identify degraded states for the vehicles 101 in the fleet. The vehicles 101 in the fleet can park in the storage area 200 and can obtain repairs at the repair station 205. Users can request vehicles 101 in the fleet for transportation services, e.g., to move from a user location to a user destination.

The server 130 can identify the degraded state for a vehicle fuel subsystem. The degraded state can be, e.g., fuel in a fuel tank longer than a fuel fill time threshold, fuel level in the fuel tank below a fuel level threshold, etc.

When fuel remains in a fuel tank, the fuel can decompose into different compounds that may not be compatible with the propulsion. When the ambient air temperature rises, the decomposition can occur more quickly, decomposing the fuel into less usable compounds. Thus, when the server 130 identifies the degraded state for the vehicle fuel subsystem, the server 130 can instruct the computer 105 to actuate the propulsion to consume fuel and/or to move the vehicle 101 to a fuel station to refill the fuel tank.

When the vehicle 101 enters the storage area 200, the server 130 can receive data 115 from the computer 105 about the fuel subsystem. The data 115 can include a location of a most recent fuel fill at a fuel station, a date of the most recent fuel fill (i.e., a "fuel fill date"), an amount of fuel in the fuel tank, and a composition of the fuel. The composition of the fuel can be, e.g., gasoline at a specific octane (e.g., 87, 89, 93), an ethanol-gasoline blend (e.g., E85 having 85% ethanol, E10 having 10% ethanol, etc.), diesel, biodiesel, compressed natural gas, hydrogen, etc. The server 130 can store data about decomposition rates of the specific composition of the fuel in the fuel tank stored in the data store 135. For example, volatile compounds in the fuel can evaporate at specific temperatures, which can affect a combustion rate of the fuel. In another example, fuel blends during cold weather (e.g., winter fuel blends) can include volatile compounds that evaporate during hot weather, and fuel blends during hot weather (e.g. summer fuel blends) can lack those volatile compounds. In another example, hygroscopic compounds such as ethanol can absorb ambient humidity, increasing an amount of water mixed with the fuel, reducing the combustion rate of the fuel. The fuel blend information can be stored in the data store 135.

Accordingly, stored decomposition rates can be used to determine, based on an elapsed time, and temperature range(s) and/or other factors such as humidity over the elapsed time, whether fuel decomposition represents a degraded state of a vehicle 101. Based on the decomposition data and an ambient air temperature, the server 130 can determine a fill date threshold beyond which the fuel decomposes and the vehicle 101 should consume the fuel. The fill date threshold may be a date, e.g., a calendar day, in the past calculated from a current date indicating a date before which any added fuel would likely decompose into compounds less usable by the vehicle 101. For example, the server 130 can use the decomposition rates described above to determine a decomposition time for specific fuels, e.g., 90 days for E10 gasoline. The fill date threshold can thus be at most 90 days prior to the current date, e.g., 60 days prior to the current date, 75 days prior to the current date, 90 days prior to the current date, etc. When the fuel fill date is older than the fill date threshold, the server 130 can determine that the fuel is decomposing into compounds less usable by the propulsion. Alternatively, the fuel fill threshold can be a date in the future calculated from the date that the vehicle 101 entered the storage area 200. In this example, when a current date is beyond the determined fuel fill threshold date, the server 130 can determine that the fuel is decomposing into compounds less usable by the propulsion. The server 130 can update the fill date threshold for the vehicle 101 based on current weather data. For example, if the ambient air temperature has increased since the vehicle 101 has entered the storage area 200, the fuel may decompose more quickly, and the server 130 can determine a new fill date threshold that more quickly indicates that the vehicle 101 should consume the fuel.

The server 130 can determine an elapsed time since the vehicle 101 entered the storage area 200. Upon entering the storage area 200, the server 130 can start a timer for the vehicle 101 that measures the elapsed time of the vehicle 101 since entering the storage area 200. The server 130 can compare the elapsed time to the fill date threshold.

The server 130 can determine an ambient air temperature of the storage area. The server 130 can communicate with, e.g., an external weather forecasting source to determine the ambient air temperature. Alternatively or additionally, the server 130 can communicate with a sensor 140 that is an air temperature sensor 140 to determine the ambient air temperature.

The server 130 can compare the fuel fill date and/or the elapsed time to the fill date threshold to identify the degraded state. When the fuel fill date is before the fill date threshold or the elapsed time exceeds the fill date threshold, the server 130 can identify the degraded state for the vehicle 101. The server 130 can instruct the vehicle 101 to actuate its propulsion to consume the fuel. Alternatively or additionally, the server 130 can assign a new route to the vehicle 101 to consume the fuel. The server 130 can, upon receiving a request for one of the vehicles 101, assign a route to the vehicle 101 with degraded fuel for the request, spending the degraded fuel. The server 130 can prioritize vehicles 101 with degraded fuel, i.e., when determining vehicles 101 to which to assign routes, the server 130 can rank the available vehicles 101 in a list and can rank one of the vehicles 101 with degraded fuel higher than one of the vehicles 101 without degraded fuel, e.g., the server 130 can rank one of the vehicles 101 with degraded fuel with the highest ranking of the list and assign the vehicle 101 with the degraded fuel to the next received request. In another example, the server 130 can compare estimated lengths of assigned routes corresponding to received requests and can assign a route having a longest estimated length to one of the vehicles 101 having degraded fuel.

Alternatively still, the server 130 can instruct the vehicle 101 to move to a fuel station to receive fuel stabilizers. The fuel stabilizers can reduce evaporation of volatile compounds and/or reduce an amount of water absorbed by the hygroscopic compounds in the fuel, extending the time until the fuel decomposes.

The server 130 can identify a degraded state for a vehicle tire. The degraded state can be, e.g., a flat tire that requires replacing, a flat-spotted tire that requires movement to prevent permanent warping of the tire, etc. When a tire is damaged or remains in contact with a hard surface and/or a cold surface for an extended period of time, the server 130 can identify the degraded state and instruct the vehicle 101 to resolve the degraded state.

The server 130 can detect the vehicle 101 entering the storage area. Upon detection the vehicle 101, the server 130 can request tire pressure data 115 from the vehicle 101 from tire pressure sensors 110. The server 130 can compare the tire pressure data 115 to a tire pressure threshold. The tire pressure threshold can be determined based on tire maintenance and operation information and stored in the data store 135. The tire pressure threshold can be a range, e.g., 30-40 psi (pound-force per square inch). When the tire pressure data 115 indicate that the tire pressure for one or more of the tires is outside of the tire pressure threshold, i.e., the tire is underinflated or overinflated, the server 130 can identify a degraded state for an improperly inflated tire and instruct the vehicle 101 to move to a repair station 205 to resolve the degraded state. For example, the server 130 can instruct the vehicle 101 to move to the repair station 205 to inflate and/or replace an underinflated tire.

The server 130 can receive wheel rotation speed data 115 from wheel speed sensors 110 in the vehicle 101. The server 130 can determine whether the wheel rotation speed data 115 indicate that one or more of the wheels is rotating faster than one or more of the other wheels. When one of the wheels rotates faster than the other wheels, the tire tread may have worn away, decreasing the diameter of the tire. The server 130 can compare the wheel rotation speed data 115 for each tire to a rotation speed threshold. When the wheel rotation speed for one of the wheels exceeds the wheel rotation speeds of the other wheels, the wheel with the higher rotation can have a smaller diameter, e.g., the wheel has a spare tire, the tire has worn away, the tire requires rebalancing, the tires require rotation, etc. The computer 105 can assign a speed for the vehicle 101, and the assigned speed corresponds to a specific wheel rotation speed. The rotation speed threshold can be a speed value greater than the specific wheel rotation speed specified by the computer 105. The rotation speed threshold can be determined based on, e.g., empirical testing to determine rotation speeds resulting from specific wheel diameters at respective vehicle 101 speeds.

The server 130 can compare the wheel rotation speed data 115 for each tire to determine a wheel speed difference for each tire. The wheel speed difference can be the difference between the wheel speed of one of the tires and the average wheel speed of the other tires. The server 130 can compare the wheel speed difference to a wheel speed difference threshold. The wheel speed difference threshold can be determined based on, e.g., empirical speed testing of tires having different tread depths, modelling of wheels with different tread depths, etc. When the wheel speed difference for one of the tires exceeds the wheel speed difference threshold, the server 130 can identify the degraded state. The degraded state can indicate that, e.g., the tires require rotation, the tires require rebalancing, one or more tires requires replacement, etc. Upon identifying the degraded state, the server 130 can instruct the vehicle 101 to move to the repair station 205 to resolve the degraded state. For example, the vehicle 101 can undergo tire maintenance including e.g., tire rotation, tire rebalancing, etc.

The server 130 can receive tire tread depth data 115 from a tire tread depth sensor 110 in the vehicle 101. The tread depth threshold can be determined based on empirical testing of wet stopping distance of vehicles and/or municipal regulations, e.g., $4/32$ of an inch. The server 130 can compare the tire tread depth data 115 to the tread depth threshold. When the tire tread depth is below a tread depth threshold, the server 130 can identify the degraded state and instruct the vehicle 101 to actuate a propulsion to move to the repair station 205 to resolve the degraded state, e.g., to replace the tire. In another example, if the tire tread depth is above the tread depth threshold and the wheel speed difference exceeds the wheel speed difference threshold, the server 130 can identify the degraded state and instruct the vehicle 101 to move to the repair station 205 to resolve the degraded state, e.g., to rotate the tires.

The server 130 can identify the degraded state based on weather data and a time spent parked in the storage area, i.e., a parked time. The "parked time" of the vehicle 101 is the elapsed time since the vehicle 101 has parked and has not moved. When precipitation is predicted, e.g., rain or snow, the server 130 can instruct the vehicle 101 to move to the repair station 205 to replace the tire with precipitation tires, e.g., snow tire, snow chains, etc. When the vehicle 101 remains parked in the storage area 200 beyond a specified period of time and a pavement temperature is below a pavement temperature threshold, the server 130 can determine that the tires of the vehicle 101 can be flat-spotted, i.e., the portions of the tires in contact with the pavement of the storage area 200 have deformed and flattened, and the tires should be moved to prevent further deformation. The flat-spotted tire can cause vibrations in other portions of the vehicle 101.

The flat-spotted tire can be temporarily flat-spotted from parking on a flat surface (e.g., pavement in the storage area 200) for a period of time, e.g., one week. The tire can be temporarily flat-spotted when the ambient temperature is below a temperature threshold or is above a second temperature threshold. The server 130 can resolve the temporary flat-spotting by instructing the computer 105 to move the vehicle 101, e.g., along the remediation route 210. The flat-spotted tire can be permanently flat-spotted from parking on the flat surface for an extended period of time, e.g., more than two weeks, one or more months, etc. The flat-spotted tire can be permanently flat-spotted when the ambient temperature is below a temperature threshold or above a second temperature threshold. The server 130 can determine that the tire is permanently flat-spotting by instructing the computer 105 to move the vehicle 101 to move along the remediation route 210, e.g., for a distance of 12-16 kilometers. If the tire remains flat-spotted, the server 130 can instruct the computer 105 to move the vehicle 101 to the repair station 205 to, e.g., repair, replace, and/or reinflate the tire. To mitigate flat-spotting, the server 130 can instruct the computer 105 to move the vehicle 101 to the repair station 205 to inflate the tires closer to a maximum recommended tire pressure, e.g., if the recommended tire pressure is 30-35 psi, the server 105 can instruct the repair station 205 to inflate the tires of the vehicle 101 to 33-35 psi.

The server 130 can collect pavement temperature data from temperature sensors 140 in or on the pavement of the storage area 200. The server 130 can identify the degraded state when the pavement temperature is below a pavement temperature threshold and the parked time of the vehicle 101 exceeds a parked time threshold. The pavement temperature threshold and the parked time threshold can be determined based on empirical testing and/or modeling of tire materials, tread depths, and pavement temperatures, e.g., testing to satisfy Federal Motor Vehicle Safety Standard ("FMVSS") No. 109 for tires. Upon identifying the degraded state, the server 130 can instruct the vehicle 101 to actuate the propulsion to move the vehicle 101, moving portions of the tire that were previously in contact with the pavement away from the pavement.

The server 130 can identify a degraded state for a battery of the vehicle 101. The degraded state for the battery can be a determination that a charge level of the battery is below a battery charge threshold. The server 130 can determine to assign routes only to vehicles 101 having charge levels that are high enough to sufficiently allow the vehicle 101 to complete the route without a recharge. When the vehicle 101 returns to the lot 200, the computer 105 can determine the charge level of the battery and send a message indicating the charge level to the server 130. The server 130 can determine whether the charge level is below the battery charge threshold. The battery charge threshold can be determined as a charge level required to operate the vehicle 101 along a route of a specified length, e.g., an average length of an assigned route. For example, the battery charge threshold can be 56%. When the server 130 determines that the charge level is below the battery charge threshold, the server 130 can identify the degraded state and can determine to instruct the computer 105 to move the vehicle 101 to a charging station to recharge. The server 130 can determine a recharge time, i.e., an elapsed time for the vehicle 101 to be connected to the charging station, and can to instruct the computer 105 to remain connected to the charging station for the recharge time. The recharge time can be determined based on, e.g., the charging rate of the charging station, the charge level of the battery, the age of the battery, the ambient air temperature, etc.

The charging station can include charging terminals that charge the battery at different charging rates. For example, a first charging terminal can have a charging rate of 1.7 kilowatts (kW), a second charging terminal can have a charging rage of 19.2 kW, and a third charging terminal can have a charging rate of 40 kW. The charging terminal can have a different charging rate, e.g., a charging rate between 1-50 kW. The higher charging rates (e.g., 40 kW) can recharge the battery more quickly than the lower charging rages (e.g., 1.7 kW). The terminals with the highest charging rates (e.g., 40 kW) can be more expensive and/or more cumbersome to use and/or may be used by vehicles 101 that could be needed for a route within a predetermined time period (e.g., an hour), and the terminal with the lowest charging rates (e.g., 1.7 kW) can be easiest to use, so the server 130 can assign vehicles 101 to the terminals with the lowest charging rates when the vehicles 101 are not needed for a route within the time necessary to recharge the battery at the lowest charging rate. At 1.7 kW, the charging time can be about 10 hours to achieve a charge level of 90%. At 19.2 kW, the charging time can be about 1 hour to achieve a charge level of 75%. At 40 kW, the charging time can be about 15 minutes to achieve a charge level of 75%.

Upon detecting the vehicle 101 returning to the storage area 200, the server 130 can request a charge level of the battery of the vehicle 101. The server 130 can determine an average time that vehicles 101 remain in the storage area 200 before being assigned for a route, i.e., a "storage time." In an example, when users demand more vehicles 101 from the storage area 200 (e.g., during work commuting hours), the storage time can be less than one hour. When demand for the vehicles 101 decreases, e.g., during night, the storage time can be greater than 10 hours. When the storage time is more than one hour but less than 10 hours, the server 130 can instruct the vehicle 101 to attain a charge level of 75% at the charging terminal with the 19.2 kW charging rate. The server 130 can instruct the computer 105 to charge at the charging terminal for one hour, and after the one hour has elapsed, if the charge level is 75% or higher, the computer 105 can release the vehicle 101 from the charging terminal. Otherwise, the computer 105 can remain at the charging terminal until achieving the charge level of 75%. When the storage time is less than one hour, the server 130 can instruct the vehicle 101 to attain a charge level of, e.g., 75% at the charging terminal with the 40 kW charging rate. The server 130 can instruct the computer 105 to charge at the charging terminal for a specified time, e.g., fifteen minutes, and after the fifteen has elapsed, if the charge level is 75% or higher, the computer 105 can release the vehicle 101 from the charging terminal. Otherwise, the computer 105 can remain at the charging terminal until achieving the charge level of 75%. When the storage time is greater than 10 hours and/or the ambient temperature exceeds a temperature threshold (e.g., 40° C.), the server 130 can instruct the vehicle 101 to attain a charge level of, e.g., 90% at the charging terminal with the 1.7 kW charging rate. The server 130 can instruct the computer 105 to charge at the charging terminal for ten hours, and after the ten hours have elapsed, if the charge level is 90% or higher, the computer 105 can release the vehicle 101 from the charging terminal. Otherwise, the computer 105 can remain at the charging terminal until achieving the charge level of 90%. Thus, the server 130 instructs the computer 105 to charge the battery at the charging station for at least the specified time to attain the specified charge level.

The server 130 can determine whether the charge level of the battery exceeds a second threshold. During maintenance of the battery, the server 130 can determine to deplete the charge of the battery below the second threshold to, e.g., mitigate hysteresis effects of battery voltage and battery chemistry degradation effects. Batteries typically include chemicals that store and transfer electrical energy, e.g., an electrode, an anode, a cathode, an electrolyte, etc. Chemicals used in batteries can include, e.g., lead, lead oxide, sulfuric acid, lithium, nickel, copper, magnesium, etc. Movement of electrons between the chemicals caused by chemical reactions between the chemicals transfers electrical energy from the battery to, e.g., a vehicle component 120. Applying electrons to the chemicals (e.g., during recharging of the battery) can reverse the chemical reactions, increasing the electrical energy stored in the battery. After a plurality of recharges, the battery chemistry can degrade, and less electrical energy can be stored in a specific battery. Charge levels above the second threshold can increase degradation of the chemicals by, e.g., changing a voltage of the battery. The change of the voltage of the battery at high and low charge levels is a "hysteresis" effect. The second threshold can be specified based as a charge level above which the hysteresis effects and the battery chemistry effects can degrade the chemicals in the battery. For example, the second threshold can be 90%. When the server 130 determines that the charge level of the battery exceeds the second threshold, the server 130 can identify the degraded state and can instruct the computer 105 to actuate the propulsion to move the vehicle 101 to deplete the battery. For example, the server 130 can instruct the computer 105 to move the vehicle 101 along the route in the storage area 200.

The server 130 can determine whether an ambient temperature is above an ambient temperature threshold. Based on the ambient temperature and the battery charge level, the server 130 can determine whether there is a degraded state for the battery. Ambient temperatures above a threshold, e.g., 40° C., can affect battery chemistry, discharging the battery faster than ambient temperatures below 40° C. and retaining less charge during a recharge. When the server 130 determines that the ambient temperature is above the ambient temperature threshold, the server 130 can identify the degraded state and instruct the computer 105 to move the vehicle 101 to the repair station 205.

The server 130 can determine whether the ambient temperature is below a second ambient temperature threshold. Ambient temperature below a second threshold, e.g., 0° C., can affect battery chemistry, discharging the battery faster than ambient temperatures above 0° C. and retaining less charge during a recharge. The server 130 can determine to instruct the computer 105 to actuate the battery in response to the degraded state when the ambient temperature is below the ambient temperature threshold and above the second ambient temperature threshold, and the battery charge level is blow a battery charge threshold to move the vehicle 101 to recharge the battery. Thus, the computer 105 can recharge the battery at an ambient temperature better suited to recharging the battery than ambient temperature above the ambient temperature threshold (i.e., where heat can affect battery chemistry) and below the second ambient temperature threshold (i.e., where cold can affect battery chemistry).

The server 130 can instruct the computer 105 to wait for a predetermined period of time before moving the vehicle 101 to the charging station. When the ambient air temperature is above the ambient temperature threshold, the ambient air temperature can fall after a predetermined period of time, e.g., after sunset. When the ambient air temperature is below the second ambient temperature threshold, the ambient air temperature can rise after a predetermined period of time, e.g., after sunrise. The server 130 can instruct the computer 105 to wait for a predetermined period of time, e.g., four hours, until the ambient air temperature drops below the ambient temperature threshold or rises above the second ambient temperature threshold.

The server 130 can identify a degraded state for a brake. The degraded state can indicate whether the brake requires replacing, repair, or actuation to remove rust and/or precipitation. The server 130 can collect data 115 about a time since brake maintenance, a time since arriving in the storage area 200, ambient air temperature, ambient precipitation, and precipitation forecasts to determine whether there is a degraded state for the brake.

The server 130 can determine whether the brake has been stagnant and requires actuation to remove rust and/or precipitation. As the brake remains unused, the brake can absorb water from precipitation, causing rust and/or slippage between the brake pad and the vehicle body. The server 130 can determine an elapsed time since the vehicle 101 has entered the storage area 200. When the elapsed time exceeds a time threshold, the server 130 can identify the degraded state and can instruct the computer 105 to actuate the propulsion to move the vehicle 101 along a remediation route 210, actuating the brake at predetermined intervals, to remove the rust and/or to heat the brake pad to remove the absorbed water. The time threshold can be determined based on the precipitation levels since the vehicle 101 has entered the storage area 200, e.g., one week.

The server 130 can identify a brake engagement date. The brake engagement date indicates a most recent date that a brake of the vehicle 101 was actuated. The server 130 can identify the degraded state when the brake engagement date is older than a brake engagement date threshold. The brake engagement date threshold can be determined based on material properties of the brake and/or precipitation levels since the vehicle 101 has entered the storage area 200, e.g., one week. When the brake engagement date is older than the brake engagement date threshold, the server 130 can instruct the computer 105 to actuate the brake to resolve the degraded state. For example, the server 130 can instruct the computer 105 to actuate the propulsion to move the vehicle 101 around the remediation route 210, actuating the brake at predetermined intervals, to heat the brake pad to remove the absorbed water.

The server 130 can determine whether the vehicle 101 experienced precipitation on a most recent route. If the vehicle 101 has experienced precipitation on the most recent route, the brake may have absorbed water from the precipitation. The server 130 can collect precipitation data from the locations on the route. If the precipitation data exceed a precipitation threshold, the server 130 can identify the degraded state and instruct the computer 105 to actuate the propulsion to move the vehicle 101 around the route, actuating the brake at predetermined intervals, to heat the brake pad to remove the absorbed water.

The server 130 can determine whether precipitation is impending. The server 130 can collect data 115 about weather forecasts to determine whether precipitation is likely in in a future time horizon, e.g., one day. If a precipitation likelihood is above a likelihood threshold, the server 130 can identify the degraded state and instruct the computer 105 to actuate the propulsion to move the vehicle 101 around the route, actuating the brake at predetermined intervals, to heat the brake pad to remove any absorbed water.

The server 130 can determine a time since the brake has undergone maintenance. Brakes typically have a predetermined maintenance schedule determined by, e.g., a brake manufacturer. When the time elapsed since the previous maintenance exceeds a time threshold, the server 130 can identify the degraded state and instruct the computer 105 to move the vehicle to the repair station 205 to replace and/or repair the brake. Alternatively or additionally, when a mileage elapsed since the previous maintenance exceeds a mileage threshold, the server 130 can identify the degraded state and instruct the computer 105 to move the vehicle to the repair station 205 to replace and/or repair the brake. Alternatively or additionally, when a brake duty cycle, i.e., a percentage of time per time period (e.g., one minute) during which the brake is applied, exceeds a duty cycle threshold, the server 130 can identify the degraded state and instruct the computer 105 to move the vehicle to the repair station 205 to replace and/or repair the brake.

The server 130 can, upon identifying the degraded state, instruct the computer 105 to move the vehicle 101 to a dynamometer. The dynamometer may be a platform with rollers in communication with infrastructure sensors 140 that collect data 115 about propulsion output. The computer 105 can actuate the propulsion, rotating the wheels and the rollers. The server 130 can instruct the computer 105 to move the vehicle 101 to the dynamometer to rotate the rollers, actuating the brake at predetermined intervals, to remove rust and/or precipitation from the brake.

The server 130 can determine whether snow mitigation medium has been applied to a roadway. Snow mitigation medium can include, e.g., salts that melt snow and/or ice on the roadway. The snow mitigation medium can generate rust on the brakes. The server 130 can collect data 115 about an amount of snow mitigation medium applied to roadways from, e.g., snow removal trucks on the roadway. The amount of snow mitigation medium data 115 can be a weight of snow mitigation medium applied to the roadway. The server 130 can determine a snow mitigation medium threshold, e.g., 100 pounds, beyond which the server 130 can identify a degraded state for a vehicle 101 returning to the storage area 200 after the snow mitigation medium threshold has been exceeded. The server 130 can instruct the computer 105 of the vehicle 101 to move the vehicle 101 to the repair station 205 to wash the underbody of the vehicle 101 to remove the snow mitigation medium.

The server 130 can identify manufacturer-recommended maintenance for the vehicles 101. A manufacturer can provide recommended maintenance for vehicle components 120 to the data store 135, e.g., a time elapsed between coolant flushes, a time elapsed and/or distance traveled between oil changes, a time elapsed and/or number of charges between replacement of the battery, etc. The server 130 can, for each vehicle 101, determine whether the components 120 of the vehicle 101 require the manufacturer-recommended maintenance. For example, the manufacturer-recommended maintenance is an oil change for a distance driven of 7500 miles, the server 130 can identify one of the vehicles 101 that has traveled at least 7500 miles since a previously recorded oil change. Upon identifying the vehicle 101 that has traveled at least 7500 miles, the server 130 can instruct the computer 105 to move the vehicle 101 to the repair station 205 to undergo an oil change.

Figure 3:
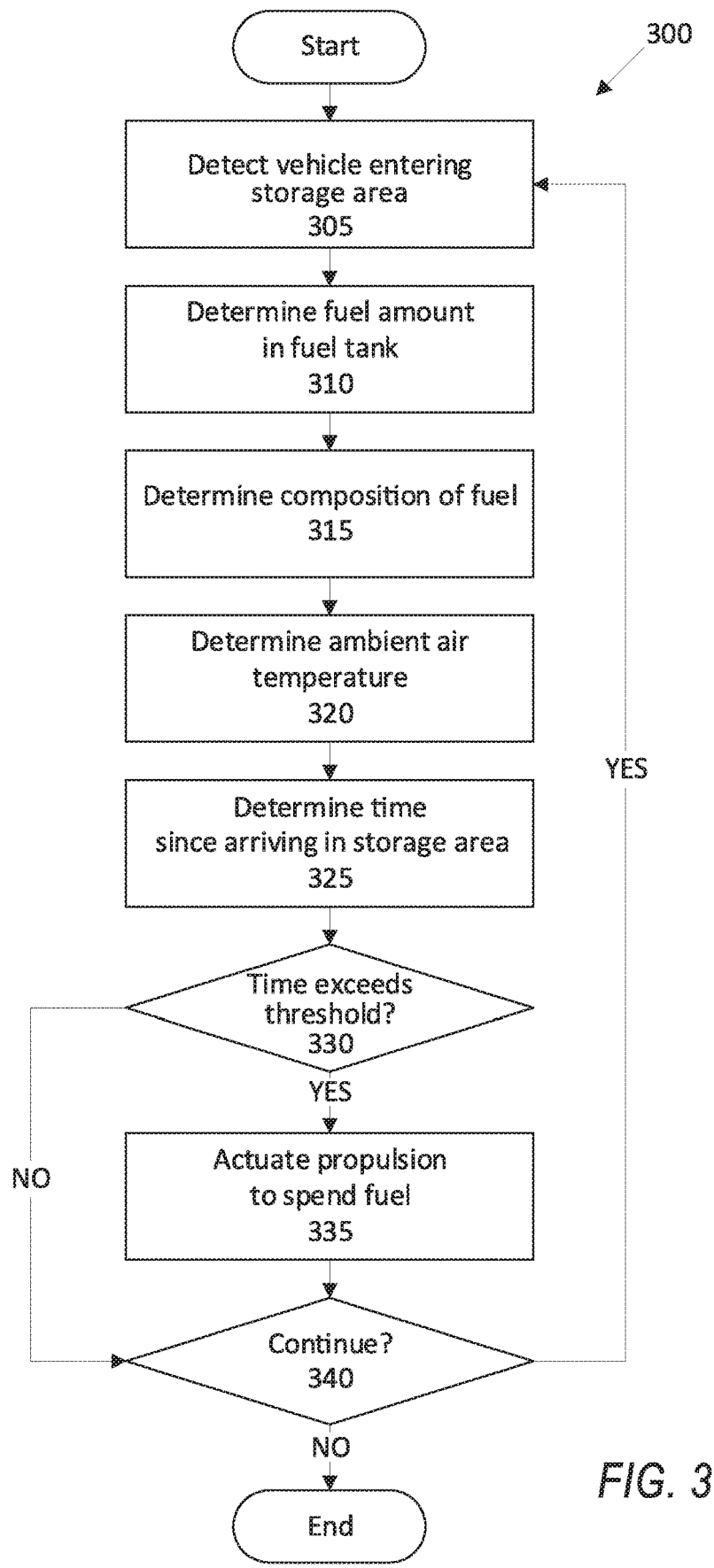
FIG. 3 is a block diagram of an example process for a vehicle component diagnostic for a fuel tank.

FIG. 3 is a block diagram of an example process 300 for identifying a degraded state for a fuel subsystem. The process 300 begins in a block 305, in which a server 130 detects a vehicle 101 entering a storage area 200. As described above, the server 130 can actuate sensors 140 to detect vehicles 101 entering and leaving the storage area 200.

Next, in a block 310, the server 130 determines a remaining amount of fuel in a fuel tank of the vehicle 101. The server 130 can instruct a computer 105 in the vehicle 101 to actuate a fuel tank sensor 110 to determine the remaining amount of fuel in the fuel tank.

Next, in a block 315, the server 130 determines a composition of the fuel in the fuel tank. The server 130 can instruct the computer 105 to send a notification indicating one or more recent fuel fills (at least including a most recent fuel fill) and the composition of the fuel at the fuel fill. For example, the notification can state that the most recent fill was 20 gallons of E10 gasoline with an 87 octane rating, winter blend. If the composition of the fuel from one of the fuel fills is different from the composition of the fuel from another of the fuel fills, the server 130 can interpolate the fuel data with conventional numerical approximation techniques.

Next, in a block 320, the server 130 determines an ambient air temperature. The server 130 can actuate one of the sensors 140 that is a temperature sensor 140 to determine an ambient air temperature of the storage area 200. Alternatively or additionally, the server 130 can communicate with a weather station to receive the ambient air temperature.

Next, in a block 325, the server 130 determines a time elapsed since the vehicle 101 has entered the storage area 200. When the vehicle 101 remains in the storage area 200 without being assigned a route, ethanol and other hygroscopic compounds in the fuel can absorb water from ambient humidity, reducing a fuel efficiency of the propulsion of the vehicle 101. As the time elapsed increases, more water can be absorbed by the stagnant fuel.

Next, in a block 330, the server 130 determines whether the time elapsed exceeds a time threshold. Alternatively, the server 130 can determine whether the fuel fill date is older than a fill date threshold. The time threshold and the fill date threshold can be determined based on the composition of the fuel and the ambient air temperature, as described above. For example, if the composition of the fuel is an E85 winter blend, and the ambient air temperature is 30° C., the server 130 can determine that the time threshold is 60 days and the fill date threshold is 60 days prior to the current date. Alternatively, the time threshold can be 90 days. If the time elapsed exceeds the time threshold, the process 300 continues in a block 335. Alternatively, if the fuel fill date is older than the fill date threshold, the process 300 continues in a block 335. Otherwise, the process 300 continues in a block 340.

In the block 335, the server 130 instructs the computer 105 to actuate the propulsion in the vehicle 101. The server 130 can instruct the computer 105 to idle the propulsion to consume at least a portion of the fuel. Alternatively or additionally, the server 130 can instruct the computer 105 to move the vehicle 101 to a fuel station to receive fuel stabilizers and/or additional fuel. Yet alternatively or additionally, the server 130 can assign a new route to the vehicle 101 to consume the fuel, e.g., the server 130 can assign a next assigned route to the vehicle 101 to consume the degraded fuel.

In the block 340, the server 130 determines whether to continue the process 300. For example, the server 130 can determine to continue the process 300 when the time elapsed does not exceed the time threshold. If the server 130 determines to continue, the process 300 returns to the block 305 to detect a new vehicle 101. Otherwise, the process 300 ends.

Figure 4:
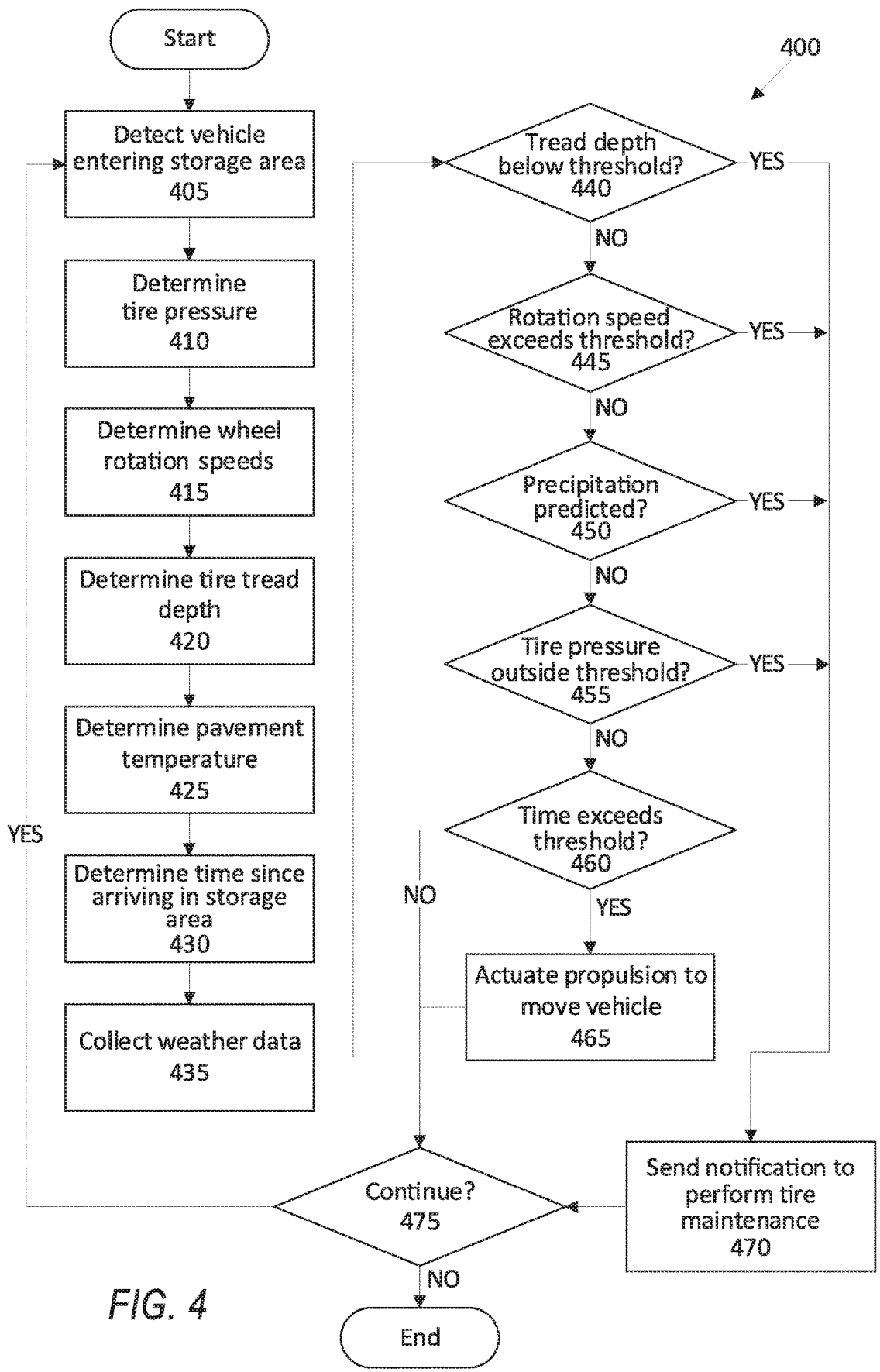
FIG. 4 is a block diagram of an example process for a vehicle component diagnostic for a tire.

FIG. 4 is a block diagram of an example process 400 for identifying a degraded state for a tire. The process 400 begins in a block 405, in which the server 130 detects a vehicle 101 entering the storage area 200. As described above, the server 130 can actuate infrastructure sensors 140 to detect vehicles 101 entering and leaving the storage area 200.

Next, in a block 410, the server 130 instructs the computer 105 to actuate sensors 110 to determine a tire pressure for each of the tires of the vehicle 101. The sensors 110 can be, e.g., tire pressure sensors that collect data 115 about the pressure of each tire.

Next, in a block 415, the server 130 instructs the computer 105 to actuate sensors 110 to determine wheel rotation speeds for each wheel of the vehicle 101. The sensors 110 can be, e.g., wheel speed sensors that collect data 115 about the rotation speed of each wheel.

Next, in a block 420, the server 130 instructs the computer 105 to actuate sensors 110 to determine a tire tread depth for each tire of the vehicle 101. The sensors 110 can be, e.g., tire tread depth sensors that collect data about a tire tread depth for each tire.

Next, in a block 425, the server 130 actuates infrastructure sensors 140 to determine a pavement temperature of the storage area 200. As described above, the infrastructure sensors 140 can include temperature sensors 140 that can measure a temperature of the pavement of the storage area 200.

Next, in a block 430, the server 130 determined an elapsed time since the vehicle 101 entered the lot 200. As described above, when the server 130 detect the vehicle 101 entering the storage area 200, the server 130 can record the time when the vehicle 101 entered the storage area 200, i.e., an entrance time of the vehicle 101. The server 130 can determine the elapsed time based on a current time and the entrance time.

Next, in a block 435, the server 130 can receive weather data 115. The server 130 can request weather data 115 from an external weather data source, e.g., a weather reporting station. The weather data 115 can include, e.g., an ambient air temperature, a precipitation prediction, a wind speed, etc.

Next, in a block 440, the server 130 determines whether the tire tread depth of the vehicle 101 is below a tire tread depth threshold. As described above, the tire tread depth can indicate a tire degraded state, e.g., that one or more of the tires renders vehicle 101 operation unsafe and/or inefficient, and may warrant replacing. If the tire tread depth is below the tire tread depth threshold, the process 400 continues in a block 470. Otherwise, the process 400 continues in a block 445.

In the block 445, the server 130 determines whether the wheel rotation speed for each wheel exceeds a rotation speed threshold. As described above, when the wheel rotation speed for one of the wheels exceeds the wheel rotation speeds of the other wheels, the wheel with the higher wheel rotation speed can have a smaller diameter, e.g., the wheel has a spare tire, the tire has worn away, etc. If the wheel rotation speed exceeds the rotation speed threshold, the process 400 continues in the block 470. Otherwise, the process 400 continues in a block 450.

In the block 450, the server 130 determines whether precipitation is predicted. Based on the weather data 115, the server 130 can determine a probability of imminent precipitation. The weather data 115 can include a forecast in a future time period, e.g., three days. If precipitation is predicted in the forecast, the tires can require more immediate maintenance. If the server 130 determines that precipitation is predicted, the process 400 continues in the block 470. Otherwise, the process 400 continues in a block 455.

In the block 455, the server 130 determines whether the tire pressure is outside a specified pressure threshold range. Tires can have a tire pressure threshold range determined by a tire manufacturer in which the tire should be inflated, e.g., 30-40 psi. The server 130 can determine whether the tire pressure for each tire is outside the pressure threshold range. If the tire pressure for at least one of the tires is outside the pressure threshold range, the process 400 continues in the block 470. Otherwise, the process 400 continues in a block 460.

In the block 460, the server 130 determines whether the elapsed time exceeds a time threshold. As described above, the time threshold can be determined based on, e.g., material properties of the tire, temperature ratings of the tire, etc. If the elapsed time exceeds the time threshold, the process 400 continues in a block 465. Otherwise, the process 400 continues in a block 475.

In the block 465, the server 130 instructs the computer 105 to actuate the propulsion to move the vehicle 101. For example, the server 130 can instruct the computer 105 to move the vehicle 101 along a remediation route 210, as described above. In another example, the server 130 can assign the vehicle 101 a route. Moving the vehicle 101 can reduce flat-spotting of the tires by moving portions of the tires in contact with the pavement away from the pavement, reducing temperature gradients in the tires and warping of the tires from the temperature gradients.

In the block 470, the server 130 identifies the degraded state for the tire of the vehicle 101 and sends a notification to the computer 105 the vehicle 101 to resolve the degraded state. The notification can include instructions to perform tire maintenance, e.g., to move the vehicle 101 to the repair station 205 to repair the tires, to replace the tires, etc.

In the block 475, the server 130 determines whether to continue the process 400. For example, the server 130 can determine to continue the process 400 when the server 130 does not identify the degraded state for the tire. If the server 130 determines to continue, the process 400 returns to the block 405 to detect another vehicle 101. Otherwise, the process 400 ends.

Figure 5:
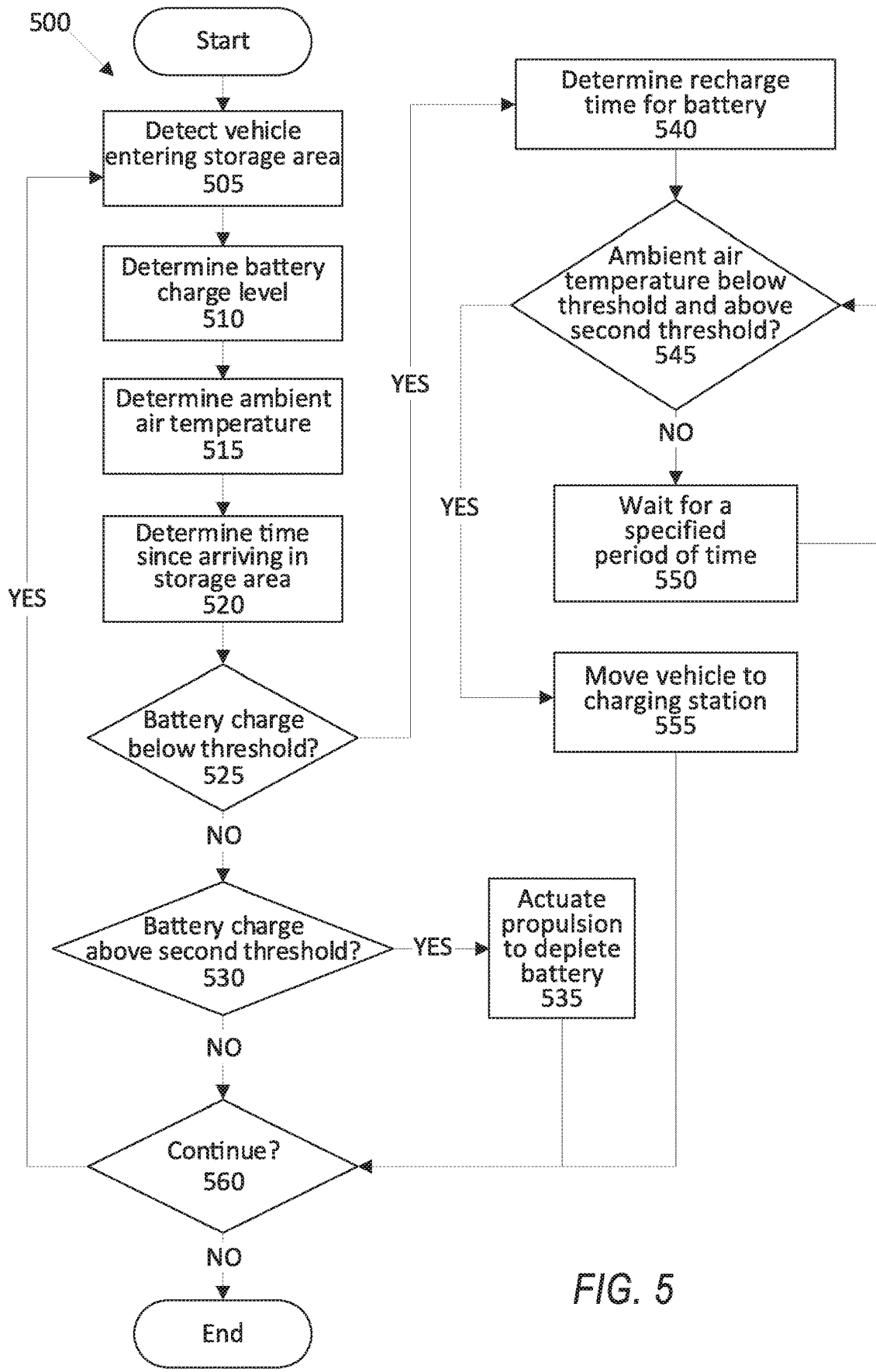
FIG. 5 is a block diagram of an example process for a vehicle component diagnostic for a battery.

FIG. 5 is a block diagram of an example process 500 for identifying a degraded state for a battery. The process 500 begins in a block 505, in which the server 130 detects a vehicle 101 entering the storage area 200. As described above, the server 130 can actuate infrastructure sensors 140 to detect vehicles 101 entering and leaving the storage area 200.

Next, in a block 510, the server 130 determines a battery charge level of a battery in the vehicle 101. The server 130 can send a request to the computer 105 for data 115 about the battery charge level of the battery.

Next, in a block 515, the server 130 determines an ambient air temperature. As described above, the server 130 can communicate with a lot sensor 140 and/or an external weather source to determine the ambient air temperature.

Next, in a block 520, the server 130 determines a time elapsed since the vehicle 101 has arrived in the storage area 200. As described above, the server 130 can start a timer when the vehicle 101 enters the storage area 200 to determine the time elapsed since the vehicle 101 arrived in the storage area 200.

Next, in a block 525, the server 130 determines whether the battery charge level is below a battery charge threshold. As described above, the battery charge threshold can be an average amount of charge that the battery requires to complete the route, e.g. 75%. If the battery charge level is below the battery charge threshold, the process 500 continues in a block 540. Otherwise, the process 500 continues in a block 530.

In the block 530, the server 130 determines whether the battery charge level is above a second battery charge threshold. As described above, the second battery charge threshold can be a charge level beyond which hysteresis and/or chemistry effects on the battery can reduce performance of the battery, e.g. 90%. When the battery charge level is above the second battery charge threshold, the process 500 continues in a block 535. Otherwise, the process 500 continues in a block 550.

In the block 535, the server 130 instructs the computer 105 to actuate the propulsion of the vehicle 101 to reduce the battery charge level to below the second battery charge threshold. The server 130 can assign a remediation route 210 around the storage area 200, as described above, to reduce the battery charge level. Alternatively or additionally, the server 130 can assign a route to the vehicle 101 to reduce the battery charge level.

In the block 540, the server 130 determines a recharge time for the battery. As described above, based on a storage time for the vehicles 101 before being requested by users, the server 130 can determine the charge time for the battery so that the battery will be recharged before the vehicle 101 is requested by users. For example, if the storage time is more than one hour but less than 10 hours, the server 130 can determine the charge time as one hour. The server 130 can further identify a specific charging terminal with a specific charging rate based on the storage time. For example, the server 130 can identify a charging terminal with a charging rate of 19.2 kW and a charging time of one hour.

Next, in a block 545, the server 130 determines whether the ambient air temperature is below a first ambient temperature threshold and above a second ambient temperature threshold. As described above, ambient air temperatures above a first temperature threshold (e.g., 40° C.) or below a second temperature threshold (e.g., 0° C.) can affect the chemistry of the battery, and thus the battery should be charged when the ambient air temperature is between the ambient temperature thresholds, e.g., between 0-40° C. If the ambient air temperature is below the first ambient temperature threshold and above the second ambient temperature threshold, the process 500 continues in a block 555. Otherwise, the process 500 continues in a block 550.

In the block 550, the server 130 instructs the computer 105 to wait for a specified period of time. When the ambient air temperature is above the first ambient temperature threshold, the ambient air temperature can fall after a specified period of time, e.g., a period of time specified based on a time of a sunset. When the ambient air temperature is below the second ambient temperature threshold, the ambient air temperature can rise after a predetermined period of time, e.g., a period of time specified based on a time of a sunrise. The server 130 can instruct the computer 105 to wait for a specified period of time, e.g., four hours, until the ambient air temperature drops below the first ambient temperature threshold or rises above the second ambient temperature threshold. After waiting for the specified period of time, the process 500 returns to the block 545.

In the block 555, the computer 105 moves the vehicle 101 to the charging station to recharge for the specified charge time. As described above, the computer 105 can move the vehicle 101 to the charging terminal with the 19.2 kW charging rate and charge the vehicle 101 for one hour.

In the block 560, the server 130 determines whether to continue the process 500. For example, the server 130 can determine to continue the process 500 when one or more vehicles 101 are at charging stations recharging. If the server 130 determines to continue, the process 500 returns to the block 505 to detect another vehicle 101. Otherwise, the process 500 ends.

Figure 6:
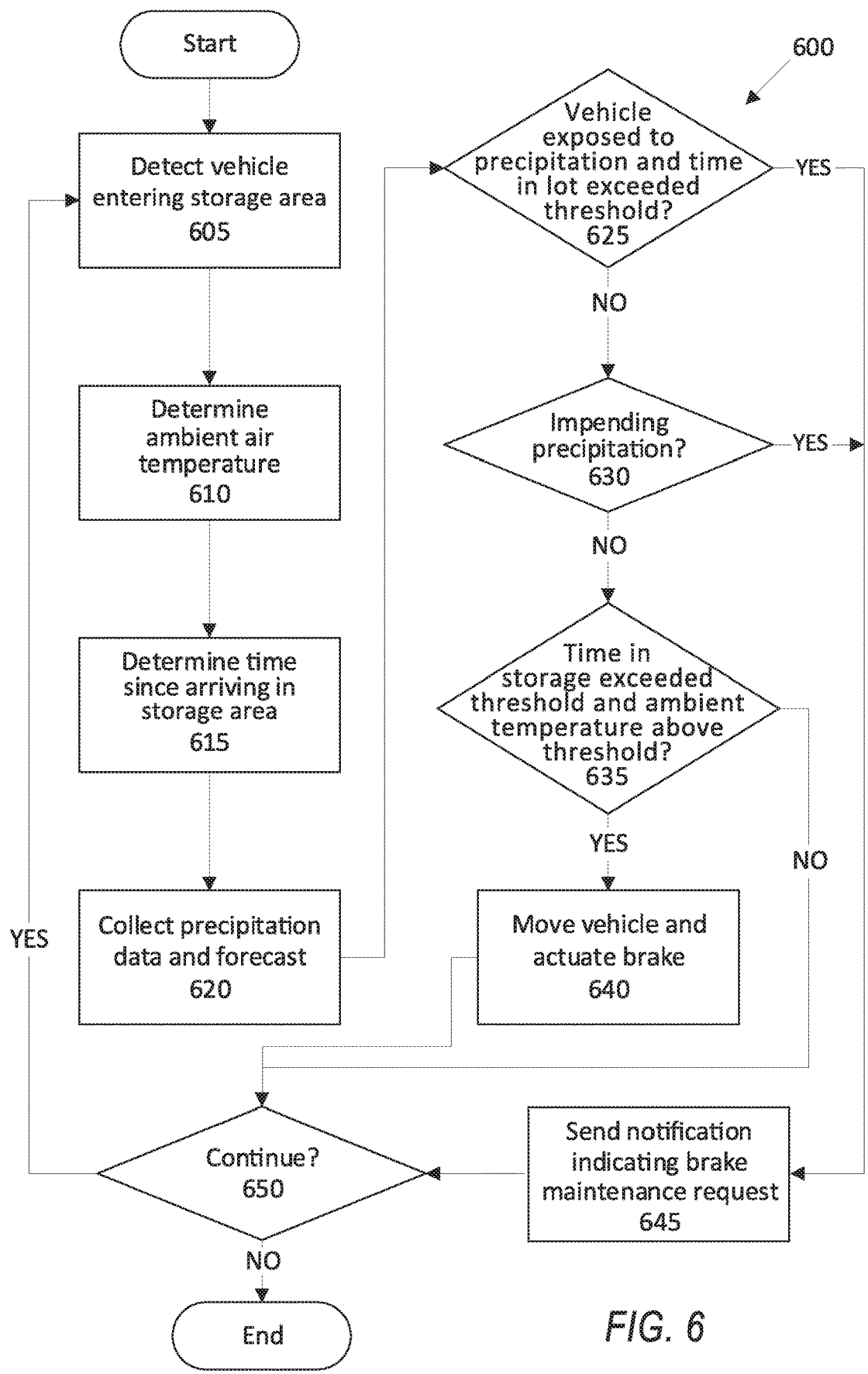
FIG. 6 is a block diagram of an example process for a vehicle component diagnostic for a brake.

FIG. 6 is a block diagram of an example process 600 for identifying a degraded state for a brake. The process 600 begins in a block 605, in which the server 130 detects a vehicle 101 entering the storage area 200. As described above, the server 130 can actuate infrastructure sensors 140 to detect vehicles 101 entering and leaving the storage area 200.

Next, in a block 610, the server determines an ambient air temperature. As described above, the server 130 can communicate with a lot sensor 140 and/or an external weather source to determine the ambient air temperature. The ambient air temperature can determine whether there is a degraded state for the brake.

Next, in a block 615, the server 130 determines a time elapsed since the vehicle 101 has arrived in the storage area 200. As described above, the server 130 can start a timer when the vehicle 101 enters the storage area 200 to determine the time elapsed since the vehicle 101 arrived in the storage area 200.

Next, in a block 620, the server 130 collects precipitation data and precipitation forecasts. As described above, the server 130 can collect precipitation data and forecasts from an external weather source.

Next, in a block 625, the server 130 determines whether the vehicle 101 has been exposed to precipitation and whether the elapsed time in the storage area 200 exceeds a time threshold. Based on the precipitation data, the server 130 can determine whether the vehicle 101 was exposed to precipitation while in the storage area 200, and whether the vehicle 101 has remained parked in the storage area 200. When the vehicle 101 remains in the storage area 200 exposed to precipitation, a brake may absorb water, reducing friction between a brake pad and a wheel and reducing performance of the brake. If the vehicle 101 has been exposed to precipitation and the elapsed time exceeds the time threshold, the process 600 continues in a block 645. Otherwise, the process 600 continues in a block 630.

In the block 630, the server 130 determines whether there is impending precipitation. As described above, based on the forecasts, the server 130 can determine that there is impending precipitation when precipitation is predicted within a forecast threshold, e.g., one day. If there is impending precipitation, the process 600 continues in the block 645. Otherwise, the process 600 continues in a block 635.

In the block 635, the server 130 determines whether the elapsed time in the storage area 200 exceeds the time threshold and the ambient air temperature is above a temperature threshold. As described above, even without precipitation, air above the temperature threshold can store water (i.e., humidity) that can be absorbed by the brake. The water absorbed by the brake can result in a degraded state. If the elapsed time exceeds the time threshold and the ambient air temperature is above the temperature threshold, the process 600 continues in a block 640. Otherwise, the process 600 continues in a block 650.

In the block 640, the server 130 identifies a degraded state for the brake and instructs the computer 105 to move the vehicle 101 and to actuate the brake to resolve the degraded state. Actuating the brake while the vehicle 101 is moving increases friction in the brake, heating the brake and evaporating absorbed water. For example, the server 130 can instruct the computer 105 to move the vehicle 101 along the remediation route 210 in the storage area 200, braking at each checkpoint 215 to evaporate the absorbed water.

In the block 645, the server 130 identifies a degraded state for the brake and sends a notification to the repair station 205 that includes a request for brake maintenance. As described above, the brake exposed to precipitation or about to be exposed to precipitation can require maintenance prior to the vehicle 101 being assigned another route. The computer 105 can move the vehicle 101 to the repair station 205 contacted by the server 130 to resolve the degraded state.

In the block 650, the server 130 determines whether to continue the process 600. For example, the server 130 can determine to continue the process 600 when the elapsed time is less than the time threshold. If the server 130 determines to continue, the process 600 returns to the block 605 to detect another vehicle 101. Otherwise, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory including instructions executable by the processor to:
   collect data of component usage of a vehicle component from a vehicle entering a storage area;
   collect a weather datum with an infrastructure sensor located in the storage area in which the vehicle enters;
   identify a degraded state of the vehicle component when the component usage exceeds a first threshold and the weather datum exceeds a second threshold; and
   then actuate the vehicle component in response to the degraded state.

2. The system of claim 1, wherein the instructions further include instructions to identify a battery charge level of a battery and to actuate the battery to move the vehicle to a charging station in response to the degraded state when the battery charge level is below a battery charge threshold.

3. The system of claim 1, wherein the instructions further include instructions to identify a tire tread depth, to identify the degraded state based on the tire tread depth, and to actuate a propulsion in response to the degraded state when the tire tread depth is below a tread depth threshold.

4. The system of claim 1, wherein the instructions further include instructions to identify a fuel fill date, the fuel fill date indicating a most recent date that a fuel tank of a vehicle was filled, and to actuate a propulsion to consume fuel in response to the degraded state when the fuel fill date is older than a fill date threshold.

5. The system of claim 1, wherein the instructions further include instructions to identify a brake engagement date, the brake engagement date indicating a most recent date that a brake of the vehicle was actuated, to identify the degraded state when the brake engagement date is older than a brake engagement date threshold and to actuate the brake in response to the degraded state.

6. The system of claim 1, wherein the instructions further include instructions to determine a pavement temperature and to identify the degraded state for a tire when the pavement temperature is below a pavement temperature threshold and an elapsed parked time for the vehicle exceeds a parked time threshold.

7. The system of claim 1, wherein the weather datum includes an ambient temperature, the instructions further include instructions to identify the degraded state based on the ambient temperature.

8. The system of claim 7, wherein the instructions further include instructions to identify a battery charge level of a battery in the vehicle and to actuate the battery in response to the degraded state when the ambient temperature is below a first temperature threshold and above a second temperature threshold and when the battery charge level is below a battery charge threshold.

9. The system of claim 1, wherein the instructions to actuate the vehicle component further include instructions to actuate a propulsion to move the vehicle along a predetermined route for a predetermined period of time.

10. The system of claim 1, wherein the component usage includes data about operation of a plurality of vehicle components from a most recent route performed by the vehicle, the route being a route followed by the vehicle from a start point to an end point.

11. The system of claim 10, wherein the instructions further include instructions to assign a new route to the vehicle upon determining that the degraded state is resolved.

12. The system of claim 1, wherein the instructions further include instructions to collect component usage data from a plurality of vehicles, to identify one or more vehicles having a respective degraded state for at least one respective vehicle component, and to assign a route at least one of the vehicles lacking a degraded state.

13. A method, comprising:
   collecting data of component usage of a vehicle component from a vehicle entering a storage area;
   collecting a weather datum with an infrastructure sensor located in the storage area in which the vehicle enters;
   identifying a degraded state of the vehicle component when the component usage exceeds a first threshold and the weather datum exceeds a second threshold; and
   then actuating the vehicle component in response to the degraded state.

14. The method of claim 13, further comprising actuating a propulsion to move the vehicle along a predetermined route for a predetermined period of time.

15. The method of claim 13, wherein the component usage includes data about operation of a plurality of vehicle components from a most recent route performed by the vehicle, the route being a route followed by the vehicle from a start point to a destination.

16. The method of claim 13, further comprising collecting component usage data from a plurality of vehicles, identifying one or more vehicles having a respective degraded state for at least one respective vehicle component, and assigning a route at least one of the vehicles lacking a degraded state.

17. A system, comprising:
   means for collecting data of component usage of a vehicle component from a vehicle entering a storage area;
   means for collecting a weather datum with an infrastructure sensor located in the storage area in which the vehicle enters;

means for identifying a degraded state of the vehicle component when the component usage exceeds a first threshold and the weather datum exceeds a second threshold; and means for actuating the vehicle component in response to the degraded state.

18. The system of claim 17, further comprising means for actuating a propulsion to move the vehicle along a predetermined route for a predetermined period of time.

19. The system of claim 17, wherein the component usage includes data about operation of a plurality of vehicle components from a most recent route performed by the vehicle, the route being a route followed by the vehicle from a start point to a destination.

20. The system of claim 17, further comprising means for collecting component usage data from a plurality of vehicles, means for identifying one or more vehicles having a respective degraded state for at least one respective vehicle component, and means for assigning a route at least one of the vehicles lacking a degraded state.

* * * * *